US008594462B2

(12) United States Patent
Furuichi

(10) Patent No.: US 8,594,462 B2
(45) Date of Patent: Nov. 26, 2013

(54) INFORMATION PROCESSING APPARATUS

(75) Inventor: Yoshio Furuichi, Mitaka (JP)

(73) Assignee: Fujitsu Mobile Communications Limited, Kawasaki (JP)

( * ) Notice: Subject to any disclaimer, the term of this patent is extended or adjusted under 35 U.S.C. 154(b) by 1317 days.

(21) Appl. No.: 12/254,051

(22) Filed: Oct. 20, 2008

(65) Prior Publication Data

US 2009/0225005 A1 Sep. 10, 2009

(30) Foreign Application Priority Data

Mar. 10, 2008 (JP) ................................ P2008-060131
Mar. 10, 2008 (JP) ................................ P2008-060132

(51) Int. Cl.
*G06K 9/32* (2006.01)

(52) U.S. Cl.
USPC ............................................ 382/295; 345/56

(58) Field of Classification Search
USPC .......... 382/100, 293, 295, 307; 348/177, 178, 348/333.13; 345/56, 103, 204, 644, 645, 345/648, 694, 696, 213, 214
See application file for complete search history.

(56) References Cited

U.S. PATENT DOCUMENTS 5,574,836 A * 11/1996 Broemmelsiek .............. 345/427
6,456,340 B1 * 9/2002 Margulis ........................ 348/745
7,426,695 B1 * 9/2008 Massaro et al. ............... 715/765
7,432,931 B2 * 10/2008 Someya et al. ............... 345/475
7,738,003 B2 * 6/2010 Jung ............................. 345/698
2001/0035874 A1 * 11/2001 Hamilton et al. ............. 345/682
2005/0162384 A1 * 7/2005 Yokoyama ..................... 345/156
2006/0022968 A1 * 2/2006 Kondo et al. ................. 345/211
2007/0067342 A1 * 3/2007 Haralambopoulos et al. .......................... 707/104.1
2007/0109284 A1 * 5/2007 Yamazaki et al. ............ 345/204
2007/0293200 A1 * 12/2007 Roundtree et al. .......... 455/414.1
2009/0315875 A1 * 12/2009 Kuroki .......................... 345/213

FOREIGN PATENT DOCUMENTS

JP 2000-227775 A 8/2000
JP 2002-215074 A 7/2002
JP 2003-223160 A 8/2003
JP 2005-208158 A 8/2005

OTHER PUBLICATIONS

JP Office Action mailed May 22, 2012 as received in application No. 2008-060132.

JP Office Action mailed on Apr. 17, 2012 as received in application No. 2008-060131.

* cited by examiner

*Primary Examiner* — Shervin Nakhjavan
(74) *Attorney, Agent, or Firm* — Maschoff Brennan

(57) ABSTRACT

According to one aspect of the invention, there is provided an information processing apparatus including: a display configured to include a display screen and to display image information at a display position on the display screen, the display screen having a plurality of pixels arranged in a matrix, the display position represented by pixel-based coordinates; a calculation module configured to calculate coordinates of a next display position at which the image information is to be displayed next based on coordinate information of the display position and differential coordinate information, the coordinate information representing a position where the image information is to be displayed, the differential coordinate information representing a pixel-based distance with which the display position shifts; and a display control module configured to control the display to display the image information at the next display position based on the coordinate thereof.

6 Claims, 8 Drawing Sheets

FIG.7A

ACCUMULATION TIME MANAGEMENT TABLE

| WALLPAPER | ACCUMULATION TIME (h) | WALLPAPER SETTABLE FLAG |
|---|---|---|
| WALLPAPER A | 0 | ON (SETTABLE) |
| WALLPAPER B | 140 | ON (SETTABLE) |
| WALLPAPER C | 300 | OFF (UNSETTABLE) |
| WALLPAPER D | 0 | ON (SETTABLE) |
| WALLPAPER E | 50 | ON (SETTABLE) |

FIG.7B

ACCUMULATION TIME MANAGEMENT TABLE

| WALLPAPER | ACCUMULATION TIME (h) | WALLPAPER SETTABLE FLAG |
|---|---|---|
| WALLPAPER A | 0 | ON (SETTABLE) |
| WALLPAPER B | 190 | ON (SETTABLE) |
| WALLPAPER C | 300 | OFF (UNSETTABLE) |
| WALLPAPER D | 0 | ON (SETTABLE) |
| WALLPAPER E | 50 | ON (SETTABLE) |

FIG.7C

ACCUMULATION TIME MANAGEMENT TABLE

| WALLPAPER | ACCUMULATION TIME (h) | WALLPAPER SETTABLE FLAG |
|---|---|---|
| WALLPAPER A | 0 | ON (SETTABLE) |
| WALLPAPER B | 300 | OFF (UNSETTABLE) |
| WALLPAPER C | 300 | OFF (UNSETTABLE) |
| WALLPAPER D | 0 | ON (SETTABLE) |
| WALLPAPER E | 50 | ON (SETTABLE) |

INFORMATION PROCESSING APPARATUS

The entire disclosure of Japanese Patent Application No. 2008-060131 and No. 2008-060132, both filed on Mar. 10, 2008, including specification, claims, drawings and abstract is incorporated herein by reference in its entirety.

BACKGROUND

1. Field of the Invention

One aspect of the present invention relates to an information processing apparatus, and in particular, to an information processing apparatus that uses an organic EL device as a display.

2. Description of the Related Art

Recently, a mobile phone, which is an example of an information processing apparatus, is configured not only to a simple communication function by telephone call but also to have an address book function, a mail function through a network, such as a base station or Internet, a browser function for reading Web pages, a music control function for listening to audio data, and a function for receiving terrestrial digital one-segment broadcasting. The mobile phone is configured to play received images based on a terrestrial digital one-segment broadcasting or various video contents acquired by other devices.

Accordingly, a user has a growing need for watching the video contents better. In order to meet the user's need, a recent mobile phone is suggested in which a high-brightness device, such as an organic EL device, is substituted for a Thin Film Transistor (TFT) liquid crystal display, which has been widely used hitherto. The organic Electronic Luminescent (EL) device is a display device that performs display by using an organic material, which emits light when a voltage is applied. In the organic EL device, an organic material of diamine series is deposited on a glass surface, and is self-luminous. For this reason, the organic EL device can be reduced in thickness, as compared with the known display device.

In the organic EL device, vivid display is achieved with high-brightness, but the organic material constituting the organic EL element may be deteriorated due to heat caused by light-emission since the light-emitting layer of the organic EL device is self-luminous. The deterioration of the organic material causes a decrease in light-emission brightness in the organic EL element and unstable light-emission. Furthermore, if the organic EL elements are continuously driven for a long time to display a same image at a same position on a screen, the screen may be burned.

If the screen is burned, it is difficult to use the mobile phone as a product. Accordingly, in order to prevent the screen from being burned, it is necessary to improve the device, such as an organic EL device, or to perform software control.

For this purpose, a technology is suggested in which the display device is divided into a plurality of display areas, and a display area for image information display is changed in accordance with temporal information (see JP-A-2003-223160, for instance). According to the technology disclosed in JP-A-2003-223160, it is possible to suppress current consumption and to prevent the display device from being burned.

According to the technology disclosed in JP-A-2003-223160, a display area for image information display can be changed to one of a plurality of prescribed display areas in accordance with temporal information. In this case, however, the display area of image information cannot but be changed to a prescribed display area. Of course, in the technology described in JP-A-2003-223160, a plurality of prescribed display areas may be appropriately changed in a pixel unit in accordance with the user's preference. In this case, it is time-consuming for the user to appropriately change the display area in a pixel unit in order to suppress occurrence burning in the screen, and it is not preferable in usability. In addition, the change of the display area for image information according to temporal information for every predetermined time results to an increase in power consumption.

Further, according to the technology disclosed in JP-A-2003-223160, a display area for image information display can be changed to another display area from among a plurality of prescribed display areas in accordance with the temporal information. However, when a same wallpaper is set on a standby screen for a long time, the screen may be burned.

SUMMARY

According to a first aspect of the invention, there is provided an information processing apparatus including: a display configured to include a display screen and to display image information at a display position on the display screen, the display screen having a plurality of pixels arranged in a matrix, the display position represented by pixel-based coordinates; a calculation module configured to calculate coordinates of a next display position at which the image information is to be displayed next based on coordinate information of the display position and differential coordinate information, the coordinate information representing a position where the image information is to be displayed, the differential coordinate information representing a pixel-based distance with which the display position shifts; and a display control module configured to control the display to display the image information at the next display position based on the coordinate thereof.

According to a second aspect of the invention, there is provided an information processing apparatus including: a setting module configured to set a wallpaper from among a plurality of wallpapers on a standby screen; a timer configured to measure an accumulation time from a time when the wallpaper is set; a determination module configured to determine whether or not the accumulation time associated with the wallpaper exceeds a given time; a management module configured to manage the accumulation time associated with each of the wallpapers; and a selection module configured to select a settable wallpaper whose accumulation time does not exceed the given time, wherein the setting module is configured to set the settable wallpaper on the standby screen.

BRIEF DESCRIPTION OF THE DRAWINGS

Embodiments may be described in detail with reference to the accompanying drawings, in which:

FIGS. 7A to 7C are exemplary diagrams showing an example of an accumulation time management table stored in a storage unit according to the second embodiment.

DETAILED DESCRIPTION OF THE EMBODIMENTS

Embodiments of the invention will now be described with reference to the drawings.

Figure 1A:
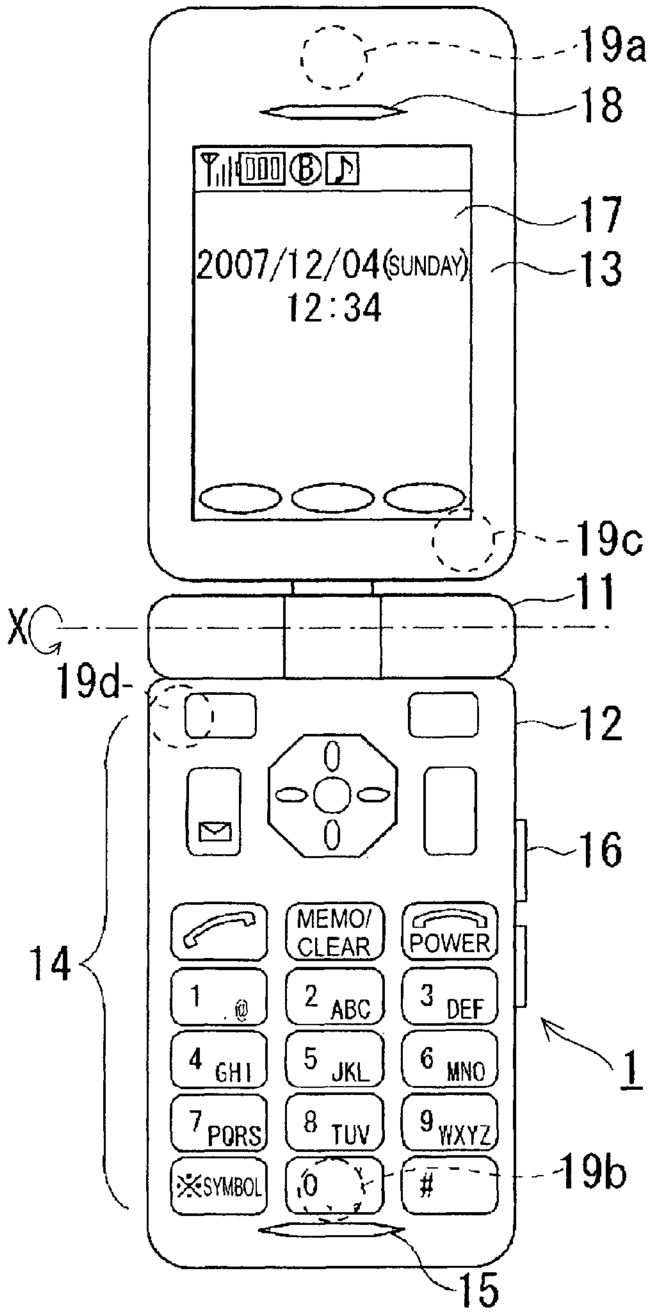
FIGS. 1A and 1B are exemplary outer appearances of a mobile phone according to a first and a second embodiments of the invention.
Figure 1B:
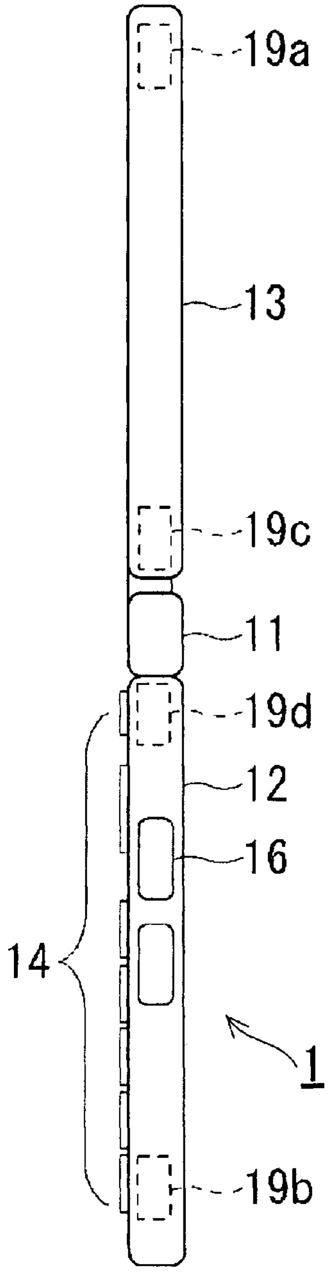

FIGS. 1A and 1B show outer appearances of a mobile phone 1, which can be applied as an information processing apparatus according to the first and second embodiments of the invention. FIG. 1A shows an outer appearance of the mobile phone 1 in a state where it is unfolded 180 degrees as viewed from a front. FIG. 1B shows an outer appearance of the mobile phone 1 in a state where it is unfolded as viewed from a side.

As shown in FIGS. 1A and 1B, in the mobile phone 1, a first casing 12 and a second casing 13 are hinged by a hinge 11 at its central portion. The mobile phone 1 is configured to be foldable in a direction of an arrow X through the hinge 11. An antenna (an antenna 31 of FIG. 3 described below) for transmission/reception is provided at a predetermined position in the mobile phone 1. With the internal antenna, the mobile phone 1 transmits and receives an electric wave to and from a base station (not shown).

On a surface of the first casing 12, operating keys 14, such as numeric keys of “0” to “9”, a call key, a redial key, an end/power key, a clear key, an email key, and the like are provided. Various instructions can be input by using the operating keys 14.

At an upper portion of the first casing 12, a directional key and an enter key are also provided as operating keys 14. A user operates the directional key in a vertical or horizontal direction, thereby moving a cursor in the vertical or horizontal direction. Specifically, various operations, such as a scroll operation of a directory or an email displayed on a main display 17 provided in a second casing 13, a page rolling operation of a simplified homepage, and a forwarding operation of an image, are performed.

Various functions can be determined by pressing the enter key. For example, according to the operation of the directional key in the first casing 12 by the user, a desired telephone number is selected from among a plurality of telephone numbers of the directory displayed on the main display 17. Then, if the enter key is pressed in an inner direction of the first casing 12, the selected telephone number is determined, and then a call request processing of the telephone number is performed.

In the first casing 12, an email key is provided on a left of the directional key and the enter key. If the email key is pressed in an inner direction of the first casing 12, a mail transmission/reception function can be called. On a right of the directional key and the enter key, a browser key is provided. If the browser key is pressed in the inner direction of the first casing 12, data of Web pages can be read.

In the first casing 12, a microphone 15 is also provided below the operating keys 14. With the microphone 15, a user’s voice during calling is collected. In the first casing 12, a side key 16 is also provided to operate the mobile phone 1.

A battery pack (not shown) is provided at a rear of the first casing 12. If the end/power key is put in an ON state, power is supplied to individual circuits from the battery pack, such that the mobile phone 1 starts to operate.

Meanwhile, the main display 17 is provided at a front of the second casing 13. On the main display 17, in addition to a reception state of an electric wave, a remaining battery charge, names or telephone numbers of persons to call or telephone numbers registered in the directory, and a transmission history, the content of an email, a simplified homepage, an image captured by a Charge Coupled Device (CCD) camera (a CCD camera 20 of FIG. 2 described below), contents received from an external contents server (not shown), and contents stored in a memory card (a memory card 46 of FIG. 3 described below) can be displayed. A receiver 18 is provided at a predetermined position above the main display 17. With the receiver 18, the user can perform a voice call. A speaker (not shown), other than the receiver 18, serving as a voice output unit is provided at a predetermined position of the mobile phone 1.

Magnetic sensors 19*a*, 19*b*, 19*c*, and 19*d* are provided at predetermined positions of the first casing 12 and the second casing 13 so as to detect the state of the mobile phone 1. The main display 17 is configured by, for example, an organic EL device.

Figure 2B:
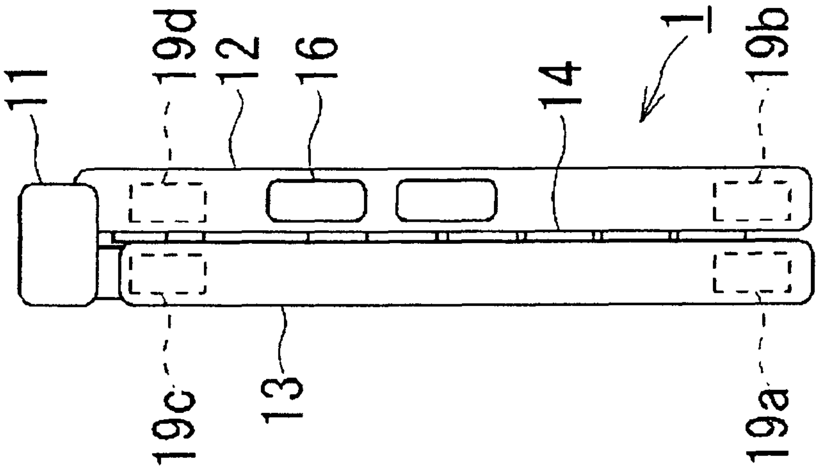
FIGS. 2A and 2B are exemplary another outer appearances of the mobile phone.
Figure 2A:
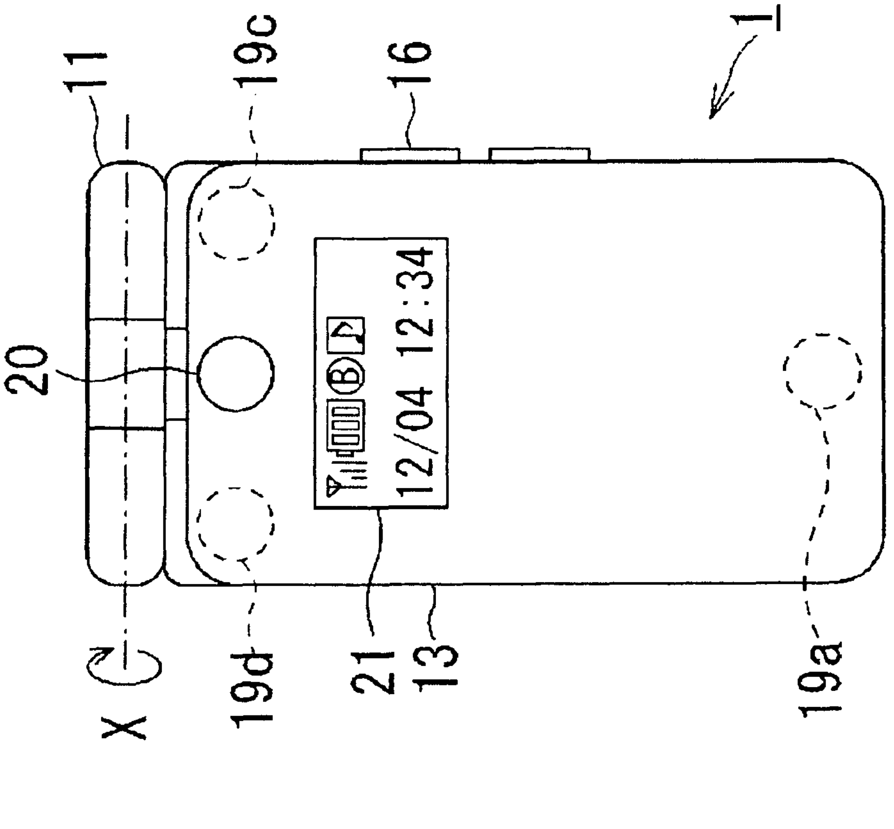

FIGS. 2A and 2B show another outer appearances of the mobile phone 1, which can be applied as an information processing apparatus according to the first and second embodiments of the invention. In FIGS. 2A and 2B, the mobile phone 1 is rotated in the direction of the arrow X from the state of the mobile phone 1 shown in FIGS. 1A and 1B. FIG. 2A shows an outer appearance of the mobile phone 1 in a state where it is folded as viewed from the front. FIG. 2B shows an outer appearance of the mobile phone 1 in a state where it is folded as viewed from the side.

At an upper portion of the second casing 13, a CCD camera 20 is provided. With the CCD camera 20, a desired subject can be captured. A sub display 21 is provided below the CCD camera 20. On the sub display 21, an antenna pict indicating a current sensitivity level of the antenna, a battery pict indicating a current remaining battery charge of the mobile phone 1, and a current time are displayed. Similarly to the main display 17, the sub display 21 is configured by an organic EL device.

Figure 3:
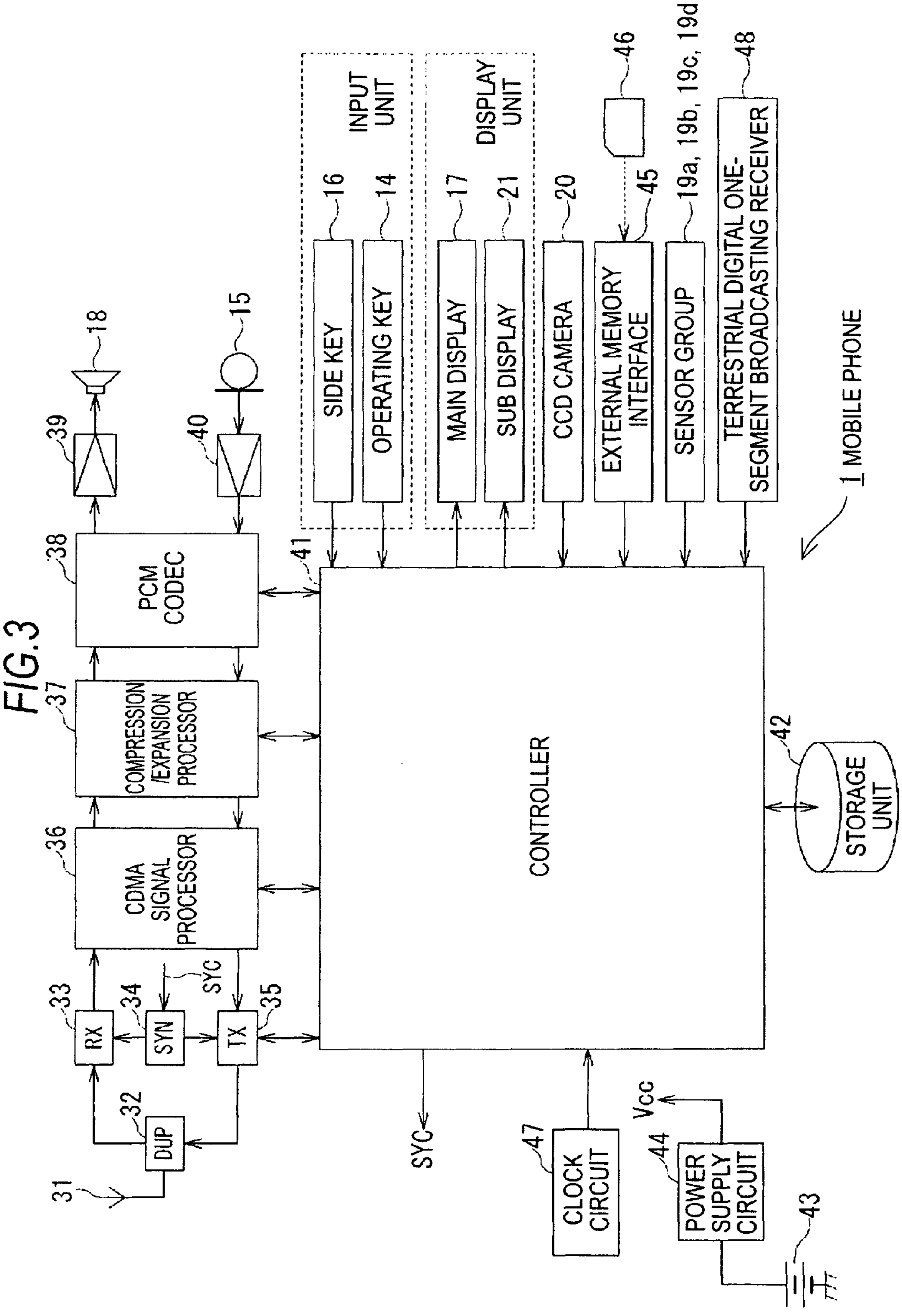
FIG. 3 is an exemplary block diagram showing an internal configuration of the mobile phone.

FIG. 3 shows an internal configuration of the mobile phone 1, which can be applied as an information processing apparatus according to the first and second embodiments of the invention. A radio signal transmitted from the base station (not shown) is received by an antenna 31 and is then input to a receiving circuit (RX) 33 through an antenna duplexer (DUP) 32. The receiving circuit 33 mixes the received radio signal with a local oscillation signal output from a frequency synthesizer (SYN) 34, and frequency-converts (down-converts) the radio signal into an intermediate frequency signal. Then, the receiving circuit 33 quadrature-demodulates the down-converted intermediate frequency signal and output a received baseband signal. The frequency of the local oscillation signal generated by the frequency synthesizer 34 is indicated by a control signal SYC output from a controller 41.

The received baseband signal from the receiving circuit 33 is input to a CDMA signal processor 36. The CDMA signal processor 36 has a RAKE receiver (not shown). The RAKE receiver despreads a plurality of paths included in the received baseband signal by using spread codes (that is, the same spread signal as a spread signal of a spread received signal). The signals of the despread paths are subject coherent Rake combination after their phases are adjusted. A sequence of data after Rake combination is subject to deinterleaving and channel decoding (error correction decoding), and binary data determination is then performed. In this way, received packet data having a predetermined transmission format is obtained. Received packet data is input to a compression/expansion processor 37.

The compression/expansion processor 37 is formed by a Digital Signal Processor (DSP). The compression/expansion processor 37 demultiplexes received packet data output from the CDMA signal processor 36 into media data by a multiplexer/demultiplexer (not shown), and decodes the demultiplexed media data. For example, in a voice call mode, audio data corresponding to a voice included in received packet data is decoded by a speech codec. Like a video phone mode, if motion image data is included in received packet data, motion image data is decoded by a video codec. If received packet data is downloaded contents, the downloaded contents is expanded and then output to the controller 41.

A digital audio signal obtained by decoding is supplied to a PCM codec 38. The PCM codec 38 PCM-decodes the digital audio signal output from the compression/expansion processor 37, and outputs an analog audio data signal after being PCM decoded to an incoming speech amplifier 39. The analog audio signal is amplified by the incoming speech amplifier 39 and then output by the receiver 18.

A digital motion image data decoded in the video codec by the compression/expansion processor 37 is input to the controller 41. The controller 41 controls the main display 17 to display a motion image based on the digital motion image signal output from the compression/expansion processor 37 through a video RAM (for example, VRAM) (not shown). The controller 41 may control the main display 17 to display motion image data captured by the CCD camera 20 through the video RAM (not shown), as well as received motion image data.

When received packet data is data of an email, the compression/expansion processor 37 supplies the email to the controller 41. The controller 41 stores the email from the compression/expansion processor 37 in a storage unit 42. Then, according to the operation of the operating keys 14 serving as an input unit by the user, the controller 41 reads out the email stored in the storage unit 42, and causes the main display 17 to display the read email.

Meanwhile, in the voice call mode, a speech signal (analog audio signal) of a speaker (user) input to the microphone 15 is amplified to an appropriate level by an outgoing speech amplifier 40, and is then subject to PCM coding by the PCM codec 38. A digital audio signal after PCM coding is input to the compression/expansion processor 37. A motion image signal output from the CCD camera 20 is digitized by the controller 41 and is then input to the compression/expansion processor 37. An email created by the controller 41 in the form of text data is also input to the compression/expansion processor 37.

The compression/expansion processor 37 compresses and encodes the digital audio signal output from the PCM codec 38 to a signal of a format according to a predetermined transmission data rate. Accordingly, audio data is generated. In addition, the compression/expansion processor 37 compresses and encodes the digital motion image signal output from the controller 41 to generate motion image data. Then, the compression/expansion processor 37 multiplexes and packetizes audio data or motion image data by the multiplexer/demultiplexer (not shown) in accordance with a predetermined transmission format, and outputs transmission packet data after being packetized to the CDMA signal processor 36. When an email is output from the controller 41, the compression/expansion processor 37 also multiplexes the email to transmission packet data.

The CDMA signal processor 36 performs a spread spectrum processing on transmission packet data output from the compression/expansion processor 37 by using spread codes assigned to a transmission channel, and outputs an output signal after the spread spectrum processing to a transmitting circuit (TX) 35. The transmitting circuit 35 modulates the signal after the spread spectrum processing by using a digital modulation scheme, such as a Quadrature Phase Shift Keying (QPSK) scheme. The transmitting circuit 35 mixes a transmission signal after digital modulation with the local oscillation signal generated from the frequency synthesizer 34, and frequency-converts (up-converts) the transmission signal into a radio signal. Next, the transmitting circuit 35 high-frequency-amplifies the up-converted radio signal to a transmission power level designated by the controller 41. The high-frequency-amplified radio signal is supplied to the antenna 31 through the antenna duplexer 32, and is then transmitted from the antenna 31 to the base station (not shown).

The mobile phone 1 also has an external memory interface 45. The external memory interface 45 has a slot into which a memory card 46 is detachably inserted. The memory card 46 is a kind of a flash memory card, such as a NAND flash memory card or a NOR flash memory card. In the memory card 46, various kinds of data, such as image, sound, and music, can be rewritten and read out through a ten-pin terminal. The mobile phone 1 also has a clock circuit (timer) 47 that measures an accurate current time. A terrestrial digital one-segment broadcasting receiver 48 receives terrestrial digital one-segment broadcasting from a broadcasting station (not shown).

The controller 41 has a Central Processing Unit (CPU) a Read Only Memory (ROM), a Random Access Memory (RAM), and the like. The CPU performs various kinds of processing according to programs stored in the ROM or various application programs loaded on the ROM from the storage unit 42, generates various control signals, and supplies the control signals to the individual parts so as to perform overall control of the mobile phone 1. The RAM appropriately stores data required when the CPU performs various kinds of processing.

The storage unit 42 has, for example, an electrically rewritable or erasable flash memory or a Hard Disc Drive (HDD). The storage unit 42 stores various application programs, which are performed by the CPU of the controller 41, or various groups of data. The storage unit 42 also stores various kinds of contents (data regarding images for wallpaper) to be settable as a wallpaper.

A power supply circuit 44 generates a predetermined operation power supply voltage Vcc on the basis of the output of the battery 43 and outputs the operation power supply voltage Vcc to the individual circuits.

First Embodiment

According to the technology disclosed in JP-A-2003-223160, a display area for image information display can be changed to one of a plurality of prescribed display areas in accordance with temporal information. In this case, however, the display area of image information cannot but be changed to a prescribed display area. Of course, in the technology described in JP-A-2003-223160, a plurality of prescribed display areas may be appropriately changed in a pixel unit in accordance with the user's preference. In this case, it is time-consuming for the user to appropriately change the display area in a pixel unit in order to suppress occurrence burning in the screen, and it is not preferable in usability. In addition, the change of the display area for image information according to temporal information for every predetermined time results to an increase in power consumption.

The first embodiment has the following configuration. First, a display position at which image information (for example, image information regarding time to be superimposed on a wallpaper of a standby screen or image information regarding calendar) is appropriately shifted in a pixel unit (for example, in units of several pixels (dots)). Then, if a user operates the operating keys 14 to input an instruction to change the display position of the image information, the set display position of the image information is shifted in a pixel unit (for example, in units of several pixels (dots)) according to a change processing of the display position of the image information. Therefore, it is possible to suitably suppress occurrence of burning in a display device. Hereinafter, an image information display position change processing using this method will be described.

Figure 4:
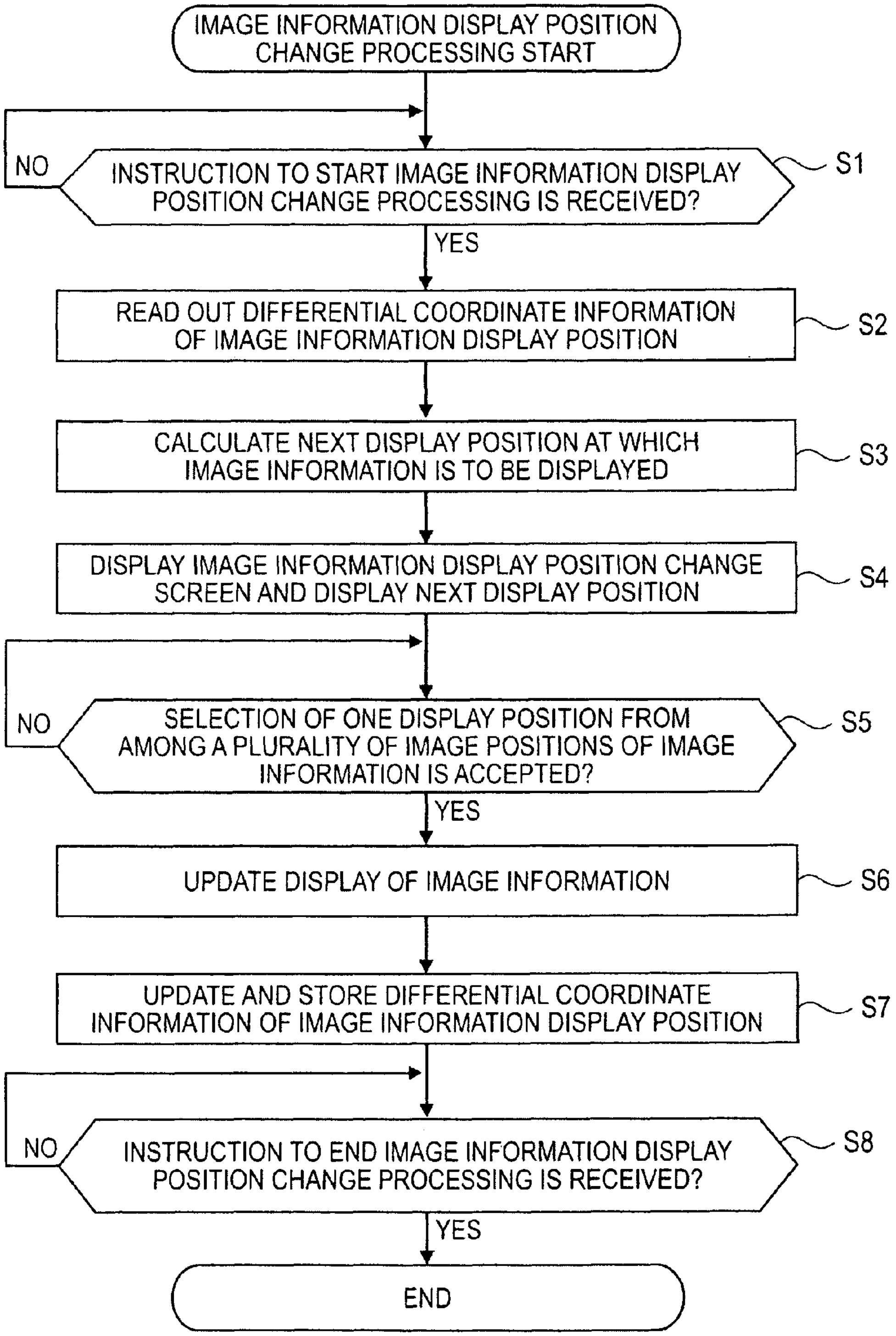
FIG. 4 is an exemplary flowchart illustrating an image information display position change processing in the mobile phone of FIG. 3 according to the first embodiment.

The image information display position change processing in the mobile phone 1 of FIG. 3 will be described with reference to a flowchart of FIG. 4. If the user operates the operating keys 14 to input an instruction to start the image information display position change processing, the image information display position change processing starts. Specifically, as a requisite for the image information display position change processing, the controller 41 of the mobile phone 1 has a wallpaper setting function for setting a desired wallpaper on the standby screen. If an instruction to set a wallpaper on the standby screen is received from the user, the controller 41 sets a wallpaper according to the user's preference onto the standby screen on a wallpaper setting screen. At this time, when receiving an instruction to change a display position of image information to be superimposed on the wallpaper of the standby screen on the wallpaper setting screen (an instruction to start the image information display position change processing), the controller 41 controls the main display 17 to display an image information display position change screen, which is a display screen for changing the display position of the image information, and starts the image information display position change processing.

The main display 17 is formed by an organic EL device and has a plurality of pixels (for example, 240×400 pixels) arranged in a matrix shape. The display position on the display screen of the main display 17 is expressed by two coordinate axes (X axis and Y axis) according to the arrangement of the plurality of pixels. On the display screen of the main display 17, as a display position for displaying image information, one or more initial display positions (for example, display positions of upper left, upper right, center, lower left, and lower right sides expressed by display positions $A_0$ to $E_0$ of FIG. 5) are provided in advance. The image information is displayed at one from among the one or more initial display positions so as to be superposed on the wallpaper on the standby screen.

Thereafter, if the image information display position change processing is performed, a display position at which image information is currently displayed is changed to another display position from among a plurality of prescribed display positions (for example, initial display positions $A_0$ to $E_0$ of FIG. 5) on the display screen. At this time, each time the image information display position change processing described below is performed, a display position at which image information is to be displayed is sequentially shifted in unit of a predetermined number of pixels according to the change in the image information display position. That is, the image information is first displayed at one initial display position (initial display positions $A_0$ to $E_0$ FIG. 5) previously set on the display screen, and if the image information display position change processing is performed once, the display position at which the image information is to be displayed is shifted in units of a predetermined number of pixels. Thereafter, each time the image information display position change processing is performed, the display position at which the image information is to be displayed is sequentially shifted from the current display position in units of a predetermined number of pixels according to the change in the image information display position.

Although in the embodiment of the invention, an example where five initial display positions (initial display positions $A_0$ to $E_0$ of FIG. 5) are provided in advance on the display screen as the initial display position, this is not intended to limit the invention. For example, four or less initial display positions or six or more initial display positions may be provided in advance.

In displaying the image information, a two-dimensional area (display area) for displaying the image information is required. In general, when the display area of the image information has a rectangular shape, the length of each side is fixed to a known value. Therefore, the display position of the image information, such as the initial display positions $A_0$ to $E_0$ of FIG. 5, is expressed by the coordinate of a center position of at least one point included in the display area of the image information by using the coordinates of two coordinate axes (X axis and Y axis) according to the arrangement of the plurality of pixels.

Figure 5:
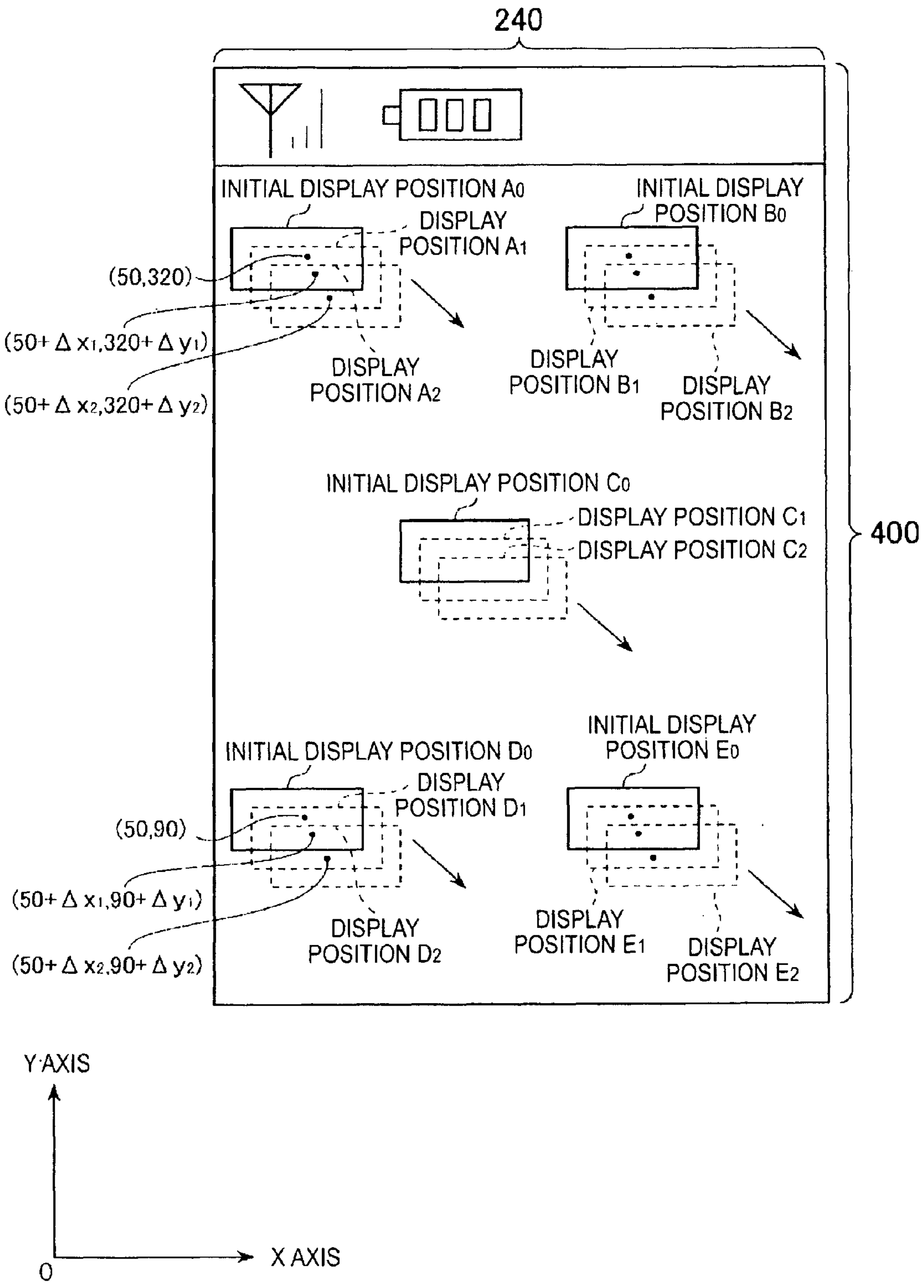
FIG. 5 is an exemplary explanatory view illustrating a shift of a display position in a pixel unit according to the image information pixel position change processing of FIG. 4.

The initial display position $A_0$ of FIG. 5 is a display position which is expressed by the coordinate (50,320) of the center position of the display area, and the display position $D_0$ of FIG. 5 is a display position which is expressed by the coordinate (50,90) of the center position of the display area. What is necessary is that the display position of the image information can be clearly represented. The display position of the image information may be expressed by coordinates other than the center position. For example, when the display area of the image information has a rectangular shape, the display position of the image information may be expressed by the coordinate of each vertex. The display area of the image information may have a shape (for example, a trapezoidal shape, a rhomboidal shape, a circular shape, or an elliptical shape) other than the rectangular shape.

In Step S1, the controller 41 determines whether or not the user operates the operating keys 14 to input an instruction to change the display position of the image information (for example, image information regarding time to be superimposed on the wallpaper of the standby screen or image information regarding calendar) to be superimposed on the wallpaper of the standby screen (an instruction to start the image information display position change processing) on the wallpaper setting screen, and waits for until the instruction to start the image information display position change processing is received.

Specifically, if the user operates the operating keys 14 to select "change of image information display position" to be displayed on the wallpaper setting screen, the controller 41 determines that the instruction to start the image information display position change processing is received.

In Step S1, if the controller 41 determines that the instruction to start the image information display position change processing is received, in Step S2, the controller 41 reads out coordinate information of all the initial display positions (when the display position of the image information is expressed by the center position, information regarding the coordinate the center position of the image information), at which the image information is to be displayed, stored in the storage unit 42. For example, coordinate information of the center positions of the initial display position $A_0$ to $E_0$ shown in FIG. 5 are read out from the storage unit 42.

Simultaneously, the controller 41 reads out differential coordinate information of the image information (that is, differential coordinate information, which is used to shift the display position of the image information in a pixel unit (in units of several pixels (dots)) stored in the storage unit 42.

The differential coordinate information includes, for example, information regarding a differential coordinate ($\Delta x$, $\Delta y$), which is used to shift the display position of the image information in a pixel unit. For example, when the display position of the image information is expressed by the center position (and the length of each side), the differential coordinate is a differential coordinate ($\Delta x$,$\Delta y$), which is used to shift the center position of the image information in a pixel unit. When the user does not operate the operating keys 14 to input the instruction to start the image information display position change processing, and the display position of the image information stills unchanged, the differential coordinate ($\Delta x$, $\Delta y$) has an initial value ($\Delta x_0$,$\Delta y_0$), specifically, (0,0). Meanwhile, when the user does not operate the operating keys 14 to input the instruction to start the image information display position change processing, and the display position of the image information is changed once or more, the differential coordinate ($\Delta x$,$\Delta y$) is sequentially changed to ($\Delta x_1$,$\Delta y_1$), ($\Delta x_2$,$\Delta y_2$), and the like according to the number of times by a differential coordinate change processing shown in Step S7, and specifically, it is changed from (0,0) to (1,−1), (2,−2), and the like according to the number of times.

In Step S3, the controller 41 calculates the coordinate of a next display position, at which the image information is to be displayed, on the basis of the coordinate information of all the initial display position (for example, initial display position $A_0$ to $E_0$ shown in FIG. 5), at which the image information is to be displayed, and the differential coordinate information, which is used to shift the display position in a pixel unit.

As shown in FIG. 5, on the basis of the coordinate of the center position of each of the initial display positions $A_0$ to $E_0$, and the differential coordinate ($\Delta x$,$\Delta y$), the coordinate of each of the display positions (display positions $A_1$ to $E_1$ or display positions $A_2$ to $E_2$) indicated by dotted lines of FIG. 5 is calculated. If it is assumed that the display position $A_0$ of FIG. 5 is a display position that is expressed by the coordinate (50,320) of the center position, and the display position $D_0$ of FIG. 5 is a display position that is expressed by the coordinate (50,90) of the center position, the next display position $A_1$ of the image information at the display position $A_0$ is expressed by the coordinate ($50+\Delta x_1$,$320+\Delta y_1$) of the center position, and the next display position $D_1$ of the image information at the display position $D_0$ is expressed by the coordinate ($50+\Delta x_1$,$90+\Delta y_1$) of the center position. More specifically, when ($\Delta x_1$,$\Delta y_1$) is (1,−1), the coordinate of the center position of the next display position $A_1$ becomes (51,319), and the coordinate of the center position of the next display position $D_1$ becomes (51,89).

The next display position $A_2$ of the image information at the display position $A_1$ of FIG. 5 is expressed by the coordinate ($50+\Delta x_2$,$320+\Delta y_2$) of the center position, and the next display position $D_2$ of the image information at the display position $D_1$ is expressed by the coordinate ($50+\Delta x_2$,$90+\Delta y_2$) of the center position. More specifically, when ($\Delta x_2$,$\Delta y_2$) is (2,−2), the coordinate of the center position of the next display position $A_2$ becomes (52,318), and the coordinate of the center position of the next display position $D_2$ becomes (52, 88).

Next, in Step S4, the controller 41 controls the main display 17 to display an image information display position change screen for changing the display position of the image information. Under the control of the controller 41, the main display 17 displays the image information display position change screen for changing the display position of the image information. In Step S3, the coordinates of the next display positions (display positions $A_0$ to $E_0$, display positions $A_1$ to $E_1$, or display positions $A_2$ to $E_2$) at which the image information is to be displayed. Then, by using the coordinates of the display positions (display positions $A_0$ to $E_0$, display positions $A_1$ to $E_1$, or display positions $A_2$ to $E_2$), the controller 41 displays the display positions of the image information on the image information display position change screen. Specifically, each time the image information display position change processing is performed, the display positions of the image information are sequentially shifted from the prescribed initial display positions (initial display positions $A_0$ to $E_0$ of FIG. 5) to the display positions $A_1$ to $E_1$, and the display position $A_2$ to $E_2$.

At this time, the user can operates the directional key from among the operating keys 14 on the image information display position change screen to focus one display position from among the display positions of FIG. 5 (display positions $A_0$ to $E_0$, display positions $A_1$ to $E_1$, or display positions $A_2$ to $E_2$). Thereafter, the user can press the enter key from among the operating keys 14 to change the display position, at which the image information is to be displayed, one from among the display positions of FIG. 5 (display positions $A_0$ to $E_0$, display positions $A_1$ to $E_1$, display positions $A_2$ to $E_2$).

In Step S5, the controller 41 determines whether or not the user operates the operating keys 14 to input a selection of one display position from among a plurality of display positions (in FIG. 5, display positions $A_0$ to $E_0$, display positions $A_1$ to $E_1$, or display positions $A_2$ to $E_2$) displayed on the image information display position change screen, and waits for until it is determined that the selection of one display position from among a plurality of display positions displayed on the image information display position change screen. For example, it is assumed that, on the image information display position change screen, as a display position, the display position $D_1$ is selected from among the display positions $A_1$ to $E_1$ or the display position $C_2$ is selected from among the display positions $A_2$ to $E_2$.

In Step S5, when the controller 41 determines that the selection of one display position from among a plurality of display positions on the image information display position change screen is accepted, in Step S6, the controller 41 controls the main display 17 to display the image information at the display position according to the selection. In other words, the controller 41 shifts the display position of the image information in a pixel unit on the basis of the display position selected from among the calculated next display positions according to the selection, and updates display of the image information.

Before the image information display position change processing, when the image information is currently displayed at the display position $A_1$, if the image information display position change processing starts, in Steps S2 to S4, the coordinate of the next display position at which the image information is to be displayed is calculated by using the differential coordinate information ($\Delta x_2$,$\Delta y_2$) (the coordinates of the display positions $A_2$ to $E_2$ are calculated). Thereafter, if the display position $C_2$ is selected from among the display positions $A_2$ to $E_2$ on the image information display position change screen as the display position of the image information, the display position of the image information is changed from the display position $A_1$ before the image information display position change processing to the display position $C_2$ on the basis of the display position $C_2$ selected from among the next display positions (display positions $A_2$ to $E_2$), while shifting from the display position $C_1$ to the display position $C_2$ in a pixel unit, and then display of the image information is updated.

In Step S7, after display of the image information is updated, the controller 41 updates the differential coordinate information of the display position of the image information stored in the storage unit 42 and stores the updated differential coordinate information in the storage unit 42. When the image information display position change processing starts, if the differential coordinate information ($\Delta x, \Delta y$) of the display position of the image information stored in the storage unit 42 is ($\Delta x_0, \Delta y_0$), it is updated to ($\Delta x_1, \Delta y_1$) by the differential coordinate information update processing shown in Step S7. In addition, when the processing starts, if the differential coordinate information ($\Delta x, \Delta y$) of the display position of the image information stored in the storage unit 42 is ($\Delta x_1, \Delta y_1$), it is updated to ($\Delta x_2, \Delta y_2$) by the differential coordinate information update processing shown in Step S7. More specifically, each time the change processing is performed, the differential coordinate ($\Delta x, \Delta y$) is updated to ($\Delta x_1, \Delta y_1$), ($\Delta x_2, \Delta y_2$), ($\Delta x_3, \Delta y_3$), . . . . For example, each time the processing is performed, the differential coordinate ($\Delta x, \Delta y$) is updated from (0,0) to (1,−1), (2,−2), (3,−3), . . . . Therefore, when a next image information display position change processing is performed, updated differential coordinate information of the display position of the image information stored in the storage unit 42 is used.

In Step S8, the controller 41 determines whether or not the user operates the operating keys 14 to input an instruction to end the image information display position change processing, and waits until it is determined that an instruction to start the image information display position change processing is received. In Step S8, if the controller 41 determines that the instruction to end the image information display position change processing is received, the image information display position change processing ends.

In the first embodiment of the invention, image information is displayed at one or a plurality of initial display positions set beforehand on a display screen, which has a plurality of pixels arranged in a matrix and is expressed by two coordinate axes in accordance with the arrangement of the plurality of pixels. Then, on the basis of coordinate information of the initial display positions, and differential coordinate information, which is used to shift the display position in a pixel unit, the coordinates of one or a plurality of next display positions, at which the image information is to be displayed by the main display 17, according to one or the plurality of initial display positions are calculated. Therefore, on the basis of the calculated coordinates of one or the plurality of next display positions, control can be performed such that the image information is displayed at one next display position or one from among the plurality of next display positions.

Therefore, the next display position can be automatically calculated with high definition as occasion demands, and it is possible to avoid an inconsistency that the display area of the image information cannot but move to the prescribed number of display areas (for example, five display areas). Thus, it is possible improve usability, and it is possible to suitably suppress occurrence of burning in the display device. Furthermore, when the display position of the image information is changed to another display position, a next display position is calculated as occasion demands. As a result, it is possible to suppress an increase in power consumption when the display position is frequently shifted.

In the first embodiment of the invention, the coordinate of the next display position, at which the image information is to be displayed, is calculated by using the differential coordinate information, which is sequentially updated with reference to the initial display position (display positions $A_0$ to $E_0$ of FIG. 5) set beforehand on the display screen, but the invention is not limited thereto. The coordinate of the next display position of the image information calculated by the image information display position change processing may be stored, and the coordinate of the next display position at which the image information is to be displayed may be calculated by using the fixed differential coordinate information.

According to the types of image information, that is, image information regarding time to be superimposed on the wallpaper of the standby screen or image information regarding calendar, the differential coordinate, which is used to shift the display portion at which the image information is to be displayed, may vary so as to fit the size of the display area where the image information is to be displayed, and may be stored as coordinate information.

In the first embodiment of the invention, as shown in FIG. 5, the prescribed five initial display positions are moved in parallel by using the same differential coordinate information, but the invention is not limited thereto. The display positions may be moved by using differential coordinates having different values in different directions (for example, different directions from among the vertical or horizontal directions, including oblique directions).

In the first embodiment of the invention, when the display position of the image information is changed to other display position, display of the image information is updated. Alternatively, when a predetermined time (for example, one week) has elapsed after the display position of the image information is shifted in a pixel unit according to the display position change processing, display of the image information may be updated. Of course, the predetermined time may be changed according to the user's preference.

As image information, in addition to image information regarding time to be superimposed on the wallpaper of the standby screen or image information regarding calendar, image information when news is displayed in a predetermined display area on the display screen, or image information, such as animation, may be used.

The invention may be applied to, in addition to the mobile phone 1, other information processing apparatuses, such as a Personal Digital Assistant (PDA), a personal computer, a portable game machine, a portable music player, and a portable motion image player.

A series of processing described in the first embodiment of the invention may be performed by software or may be performed by hardware.

Although in the first embodiment of the invention, an example where the steps in the flowchart are performed in time series according to the described sequence has been described, the steps may be not necessarily performed in time series. For example, the steps may be performed in parallel or individually.

Second Embodiment

The second embodiment, which is based on the aforementioned mobile phone 1 shown in FIGS. 1 to 3, will be described. According to the technology disclosed in JP-A-2003-223160, a display area for image information display can be changed to another display area from among a plurality of display area in accordance with temporal information. However, when the same wallpaper is set on the standby screen for a long time, the screen may be burned.

In order to overcome this drawback, the second embodiment has the following configuration. First, an accumulation time from a time when a wallpaper is set on the standby screen is measured, and when a currently set wallpaper is not changed to another wallpaper until the accumulation time from the set time exceeds a predetermined time, the wallpaper is automatically changed to another wallpaper. Furthermore, the accumulation time is set and managed for each content used as a wallpaper on the standby screen (data regarding a wallpaper image), and contents whose accumulation time exceeds the predetermined time are deleted so as not to be set and registered as a wallpaper. Therefore, it is possible to suitably suppress occurrence of burning in the display device. Hereinafter, a wallpaper change processing using this method will be described.

Figure 6:
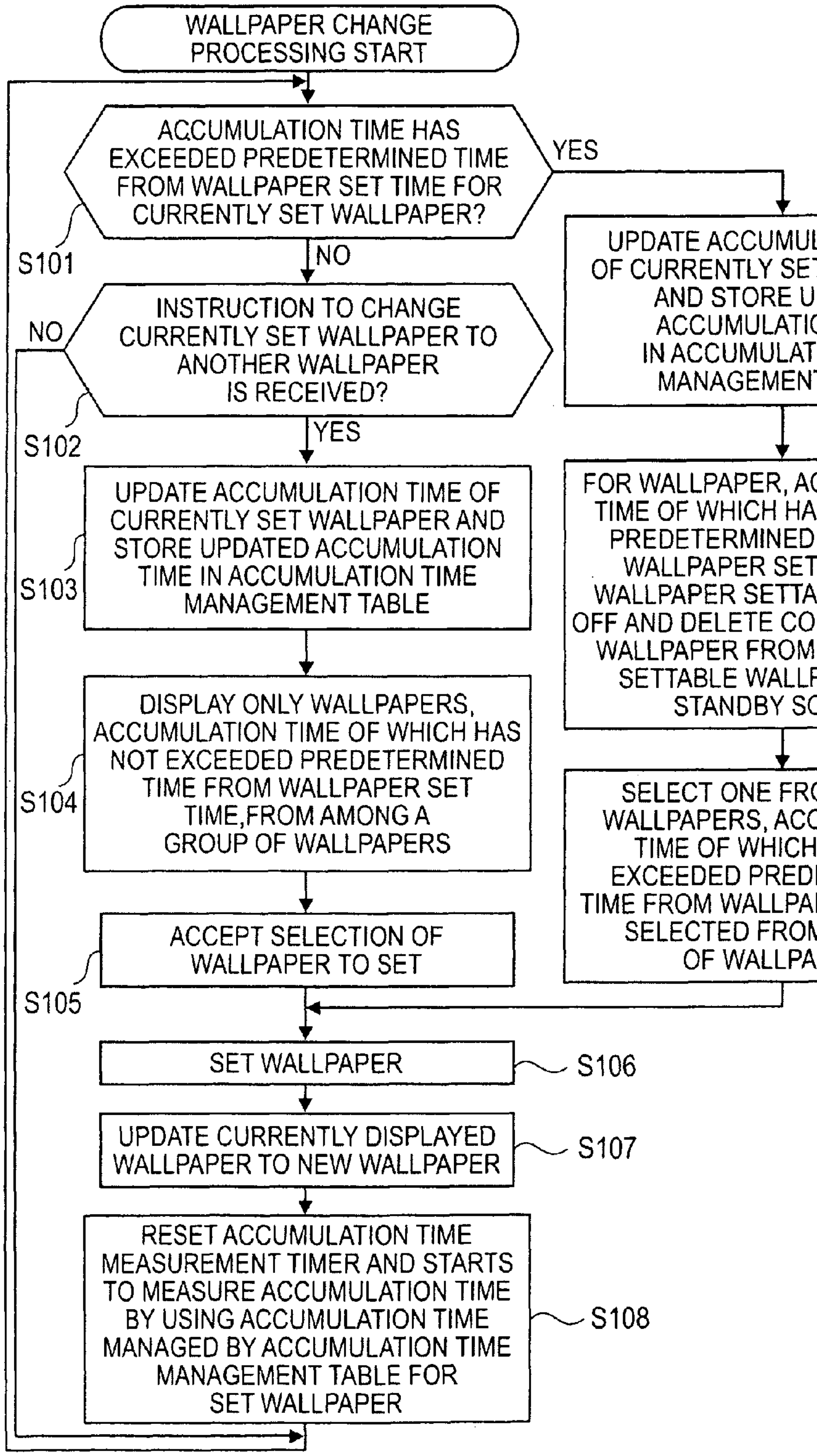
FIG. 6 is an exemplary flowchart illustrating a wallpaper change processing in the mobile phone of FIG. 3 according to the second embodiment.

The wallpaper change processing in the mobile phone 1 of FIG. 3 will be described with reference to a flowchart of FIG. 6. As a prerequisite for the wallpaper change processing, a wallpaper from among a group of wallpapers based on a user's preference (for example, a desired wallpaper or a default wallpaper before the user sets a desired wallpaper) is set on the standby screen beforehand. When a wallpaper is set on the standby screen, the controller 41 starts to measure the accumulation time from the wallpaper set time by using the clock 47 serving as an accumulation time measurement timer. In measuring the accumulation time from the wallpaper set time, instead of the clock circuit 47, the controller 41 may measure the accumulation time by using a software timer.

In Step S101, when the user operates the end/power key from among the operating keys 14 to start the mobile phone 1, the controller 41 performs the following interrupt processing regularly. That is, by using the clock circuit 47 serving as an accumulation time measurement timer, for a currently set wallpaper, the controller 41 determines whether or not the accumulation time from the wallpaper set time exceeds a predetermined time (for example, 300 hours). Of course, the predetermined time (threshold value) may be set to hours (for example, 200 hours) other than 300 hours.

The lighting state of the main display 17 includes a state where the main display 17 is lighted bright (hereinafter, referred to as "full lighting state"), a state where the main display 17 is lighted darker than the full lighting state with light-emission brightness reduced, but characters or icons on the main display 17 can be recognizable (hereinafter, referred to as "partial state"), and a state where the main display 17 does not perform display (hereinafter, referred to as "light-out state"). Of the three states, in the full lighting state, burning may be most likely to occur in the main display 17. Therefore, the accumulation time from the wallpaper set time may be an accumulation time in a main lighting state, or may be simply an accumulation time after a wallpaper is set, regardless of the lighting state.

In Step S101, in regards to the currently set wallpaper, if the controller 41 determines that the accumulation time from the wallpaper set time has not exceeded the predetermined time, in Step S102, the controller 41 determines whether or not the user operates the operating keys 14 to input an instruction to change the currently set wallpaper to another paper (for example, a desired wallpaper based on a user's preference) even though the accumulation time from the wallpaper set time has not exceeded the predetermined time for the currently set wallpaper.

In Step S102, if the controller 41 determines that the instruction to change the currently set wallpaper to another wallpaper is received, in Step S103, the controller 41 reads out an accumulation time management table stored in the storage unit 42, updates the accumulation time of the currently set wallpaper, and stores the updated accumulation time in the accumulation time management table.

FIG. 7A shows an example of the accumulation time management table stored in the storage unit 42. Referring to FIG. 7A, as wallpapers to be set on the standby screen, a wallpaper A to a wallpaper D . . . are registered, and the accumulation time (h) are registered in association with the wallpapers. For example, in case of the "wallpaper A" of the first row, since it has not been set on the standby screen, the accumulation time from the wallpaper set time is registered "0 (h)". In case of the "wallpaper B" of the second row, it has been set on the standby screen, and the accumulation time from the wallpaper set time is registered as "140 (h)".

A wallpaper settable flag for indicating settability on the standby screen is also registered in association with each wallpaper. If the wallpaper settable flag is set in an "ON" state, it indicates that, since the accumulation time from the wallpaper set time has not exceeded the predetermined time, a corresponding wallpaper is settable on the standby screen as a wallpaper afterward. Meanwhile, if the wallpaper settable flag is set in an "OFF" state, it indicates that, since the accumulation time from the wallpaper set time has exceeded the predetermined time, a corresponding wallpaper is unsettable on the standby screen as a wallpaper afterward. The wallpaper settable flag is set in the "ON" state as a default. Furthermore, when the user registers a wallpaper image as a wallpaper, the wallpaper settable flag is set in the "ON" state.

When the currently set wallpaper is the "wallpaper B", and the accumulation time has exceeded 50 hours until an instruction to change the currently set wallpaper to another wallpaper is received in Step S102, the accumulation time 50 hours is measured by the clock circuit 47 serving as the accumulation time measurement timer. In this case, the accumulation time of the wallpaper B (the accumulation time of the wallpaper B hitherto) registered in the accumulation time management table of FIG. 7A is "140 (h)". Therefore, as shown in FIG. 7B, the accumulation time registered in association with the wallpaper B is updated to "190 (h)" and then stored.

In Step S104, the controller 41 controls the main display 17 to display only wallpapers, the accumulation time of which has not exceeded the predetermined time from the wallpaper set time (wallpapers, the wallpaper setting flag of which is set in the "ON" state), from among a group of wallpapers with reference to the wallpaper settable flag of the wallpapers managed in the accumulation time management table. The main display 17 displays only wallpapers, the accumulation time of which has not exceeded the predetermined time from the wallpaper set time, from among a group of wallpapers.

Specifically, referring to FIG. 7B, the wallpapers, the wallpaper settable flag is set in the "ON" state, are "wallpaper A", "wallpaper A", "wallpaper B", "wallpaper D", and"wallpaper E". Therefore, as the wallpapers, the accumulation time of which has not exceeded the predetermined time from the wallpaper set time, the "wallpaper A", the "wallpaper B", the "wallpaper D", and the "wallpaper E" are displayed on the main display 17 in the form of a list. As a result, the user can operate the directional key from among the operating keys 14 to select as a wallpaper on the standby screen one from among the "wallpaper A", the "wallpaper B", the "wallpaper D", and the "wallpaper E".

In Step S105, the controller 41 accepts a selection of one from among a group of wallpapers displayed on the main display 17 (that is, a group of wallpapers, the accumulation time of which has not exceeded the predetermined time from the wallpaper set time) according to the operation of the directional key from among the operating keys 14 by the user. In Step S106, when the selection of one wallpaper from among a group of wallpapers is accepted, the controller 41 sets a wallpaper corresponding to the selection as a wallpaper on the standby screen.

Referring to FIG. 7B, if the user operates the directional key from among the operating keys 14 and a selection of the "wallpaper A" from among the "wallpaper A", the "wallpaper B", the "wallpaper D", and the "wallpaper E" displayed on the main display 17 is accepted, the "wallpaper A" is set as a wallpaper on the standby screen. The controller 41 stores set data about a wallpaper in the storage unit 42. Set data about the wallpaper includes data regarding a wallpaper (for example, "wallpaper A") set as a wallpaper on the standby screen.

In Step S107, the controller 41 controls the main display 17 to changes the currently displayed wallpaper to the wallpaper (for example, "wallpaper A") set as a wallpaper on the standby screen. For example, when in Steps S102 to S106 the "wallpaper A" is set, and an instruction to change the currently displayed "wallpaper B" to the "wallpaper A" is input, the "wallpaper B" currently displayed on the main display 17 is changed to the "wallpaper A".

In Step S108, the controller 41 resets the clock circuit 47 serving as an accumulation time measurement timer, and starts to measure the accumulation time of the wallpaper set as a wallpaper on the standby screen on the basis of the accumulation time managed by the accumulation time management table.

For example, when in Steps S102 to S106, the "wallpaper A" is set, and an instruction to change the "wallpaper B" currently displayed to the "wallpaper A" is input, since the accumulation time of the "wallpaper A" managed by the accumulation time management table is "0 (h)", the measurement of the accumulation time starts with the "0 (h)". Meanwhile, when in Steps S102 to S106, the "wallpaper E" is set, and an instruction to change the currently displayed "wallpaper B" to the "wallpaper E" is input, since the accumulation time of the "wallpaper A" managed by the accumulation time management table is "150 (h)", the measurement of the accumulation time starts with "50 (h)".

Thereafter, the processing returns to Step S101, and Step S101 and later are repeatedly performed.

Meanwhile, in Step S102, if the controller 41 determines that no instruction to change the currently set wallpaper to another wallpaper is input, Steps S103 to S108 are skipped, and a change processing to another wallpaper is not performed.

In Step S101, if the controller 41 determines that, for the currently set wallpaper, the accumulation time has exceeded the predetermined time from the wallpaper set time, in Step S109, the controller 41 reads out the accumulation time management table stored in the storage unit 42, updates the accumulation time of the currently set wallpaper, and stores the updated accumulation time in the accumulation time management table.

When the currently set wallpaper is the "wallpaper B", and the accumulation time has exceeded the predetermined time (for example, 300 hours) from the wallpaper set time, the clock circuit 47 serving as an accumulation time measurement timer measures 300 hours. Then, as shown in FIG. 7C, the accumulation time registered in association with the wallpaper B is updated to "300 (h)" and then stored.

In Step S110, for the wallpaper, the accumulation time of which has exceeded the predetermined time from the wallpaper set time, the controller 41 sets the wallpaper settable flag managed by the accumulation time management table in the "OFF" state, and deletes (excludes) the corresponding wallpaper from a group of settable wallpapers.

When the currently set wallpaper is the "wallpaper B", and the accumulation time has exceeded the predetermined time (for example, 300 hours) from the wallpaper set time, in order to suppress occurrence of burning in the main display 17 due to use of the same wallpaper, as shown in FIG. 7C, the wallpaper settable flag registered in association with the wallpaper B is set in the "OFF" state, and the corresponding wallpaper is deleted (excluded) from a group of settable wallpapers. For this reason, even though the user wants to set a wallpaper, which is once deleted from a group of wallpapers, as a wallpaper on the standby screen, it is impossible for the user to set the wallpaper as a wallpaper on the standby screen by the subsequent wallpaper change processing.

In Step S111, the controller 41 selects one from among wallpapers, the accumulation time of which has not exceeded the predetermined time from the wallpaper set time. In the example of FIG. 7C, since the wallpapers, the wallpaper settable flag of which is set in the "ON" state, are the "wallpaper A", the "wallpaper D", and the "wallpaper E", one wallpaper (for example, "wallpaper D") from among the "wallpaper A", the "wallpaper D", and the "wallpaper E" is automatically selected as a wallpaper on the standby screen.

Thereafter, the processing progresses to Step S106, and the wallpaper selected in Step S106 is set as a wallpaper on the standby screen, and in Step S107, the currently set wallpaper is changed to the wallpaper set as a wallpaper on the standby screen. Then, in Step S108, the clock circuit 47 serving as the accumulation time measurement timer is reset, and the measurement starts based on the accumulation time of the wallpaper managed by the accumulation time management table.

In the second embodiment of the invention, a wallpaper is set on the standby screen, and by using an accumulation time measurement timer, which measures the accumulation time from the wallpaper set time for the set wallpaper, it is determined whether or not the accumulation time of the set wallpaper has exceeded the predetermined time. Furthermore, the accumulation time of the wallpaper measured by the accumulation time measurement timer is managed by the accumulation time management table in association with the wallpaper. If it is determined that the accumulation time of the wallpaper has exceeded the predetermined time, one wallpaper is selected from among wallpapers, the accumulation time of which has not exceeded the accumulation time from the wallpaper set time, selected from a group of wallpapers. In this way, it is possible to set the selected wallpaper as a wallpaper on the standby screen. Therefore, it is possible to prevent the same wallpaper from being displayed on the standby screen for a long time. Furthermore, with automatic wallpaper selection, it is possible to save user's trouble, and as a result, it is possible to suitably suppress occurrence burning in the main display 17.

The predetermined time (threshold value) regarding the accumulation time of the wallpaper used in the embodiment of the invention may be appropriately changed in accordance with the user's preference. Further, according to the contents used as the wallpaper, since screen burning may easily occur, it is preferable to set the predetermined time (threshold value) to different values.

Figure 8:
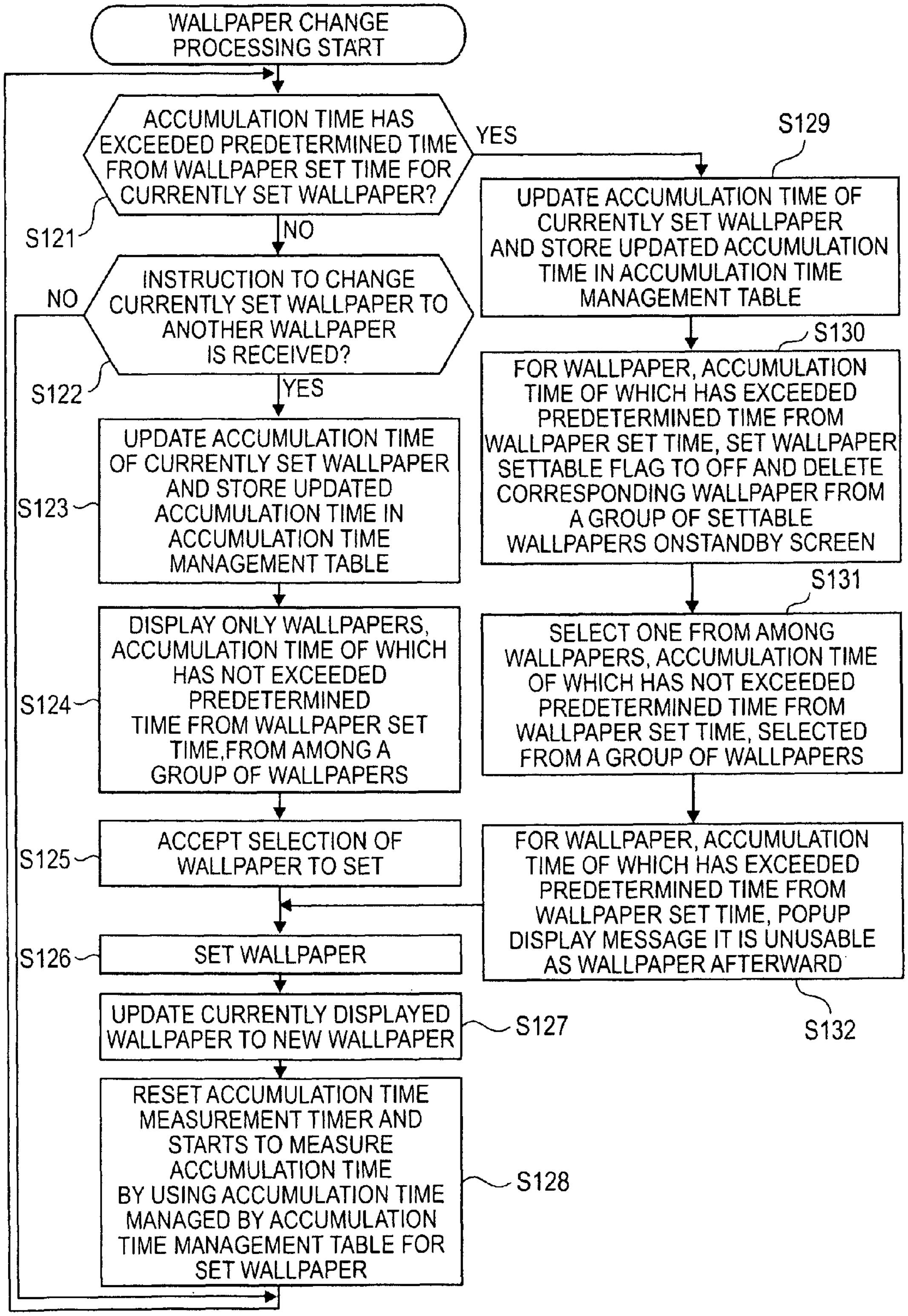
FIG. 8 is an exemplary flowchart illustrating another wallpaper change processing in the mobile phone of FIG. 3 according to the second embodiment.

In the second embodiment of the invention, for a wallpaper, the accumulation time of which has exceeded the predetermined time from the wallpaper set time, the wallpaper settable flag is set in the "OFF" state, and the corresponding wallpaper is automatically deleted from a group of settable wallpapers on the standby screen. At this time, in terms of operationality or convenience, as shown in a flowchart of FIG. 8, after a wallpaper is selected, popup display is performed to display and notify the user that the wallpaper is unusable afterward. For example, as shown in FIG. 8, in Step S131 (corresponding to Step S111), if the controller 41 selects one wallpaper from among wallpapers, the accumulation time of which has not exceeded the predetermined time from the wallpaper set time, in Step S132, the controller 41 controls the main display 17 to display in a popup manner that for a wallpaper, the accumulation time of which has exceeded the predetermined time from the wallpaper set time, is unusable as a wallpaper afterward. Specifically, as shown in FIG. 7C, the wallpaper settable flag registered in association with the wallpaper B is set in the "OFF" state and then deleted (excluded) from a group of settable wallpapers. Therefore, a message purporting that "the wallpaper B has an accumulation time that exceeds a settable accumulation time and is unusable as a wallpaper." is displayed on the main display 17 in a popup manner. Steps S121 to S131 in FIG. 8 are basically the same as Steps S101 to S111 in FIG. 6, and thus redundant descriptions thereof will be omitted.

If the accumulation time managed by the accumulation time management table is within 10 hours (several hours) before the predetermined time (for example, 300 hours), popup display may be performed to notify that the wallpaper is unusable afterward, and the user may be requested to change the wallpaper to another wallpaper.

Although in the second embodiment of the invention, a wallpaper displayed on the standby screen has been explicitly described, this is not intended to limit the invention. For example, the invention can be applied to an image other than a wallpaper. The invention can be applied to an image whose display size is smaller than a display size of the wallpaper, while the display size of the wallpaper is the same size as a size of the screen.

The invention may be applied to, in addition to the mobile phone 1, other information processing apparatuses, such as a Personal Digital Assistant (PDA), a personal computer, a portable game machine, a portable music player, and a portable motion image player.

A series of processing described in the second embodiment of the invention may be performed by software or may be performed by hardware.

Although in the second embodiment of the invention, an example where the steps in the flowchart are performed in time series according to the described sequence has been described, the steps may be not necessarily performed in time series. For example, the steps may be performed in parallel or individually.

What is claimed is:

1. An information processing apparatus comprising:

a display configured to include a display screen and to display image information at a display position on the display screen, the display screen having a plurality of pixels arranged in a matrix, the display position represented by pixel-based coordinates;

a controller including a central processing unit which performs processing according to programs stored in a memory, the controller including a calculation module configured to calculate coordinates of a next display position at which the image information is to be displayed next based on coordinate information of the display position and differential coordinate information, the coordinate information representing a position where the image information is to be displayed, the differential coordinate information representing a pixel-based distance with which the display position shifts;

a display control module configured to control the display to display the Image information at the next display position based on the coordinate thereof;

wherein the image information is to be superimposed on a wallpaper of a standby screen.

2. An information processing apparatus comprising:

a display configured to include a display screen and to display image information at a display position from among a plurality of initial display positions on the display screen, the display screen having a plurality of pixels arranged in a matrix, the initial display positions represented by pixel-based coordinates;

a controller including a central processing unit which performs processing according to programs stored in a memory, the controller including a calculation module configured to calculate coordinates of next display positions at which the image information is to be displayed next, in accordance with the initial display positions based on coordinate information of the initial positions and differential coordinate information, the differential coordinate information representing a pixel-based distance with which the display position shifts;

a display control module configured to control the display to display the Image information at one position of the next display positions based on the coordinates thereof;

wherein the image information is to be superimposed on a wallpaper of a standby screen.

3. The apparatus according to claim 2, further comprising:

a selection accepting module configured to accept a selection of one of the next display positions.

4. The apparatus according to claim 3, wherein the selection accepting module is configured to accept the selection on a change screen for changing the display position.

5. The apparatus according to claim 2, wherein the calculation module is configured to calculate the coordinates of the next display positions when changing the display position is instructed or when a given time elapses after the display position is changed.

6. The apparatus according to claim 2, further comprising a memory configured to store the differential coordinate information, wherein the differential coordinate information is updated after the display module displays the image information.

* * * * *